No. 671,163. Patented Apr. 2, 1901.
A. R. FERGUSSON.
LIFE SAVING APPARATUS.
(Application filed Mar. 23, 1900.)
(No Model.) 9 Sheets—Sheet 2.
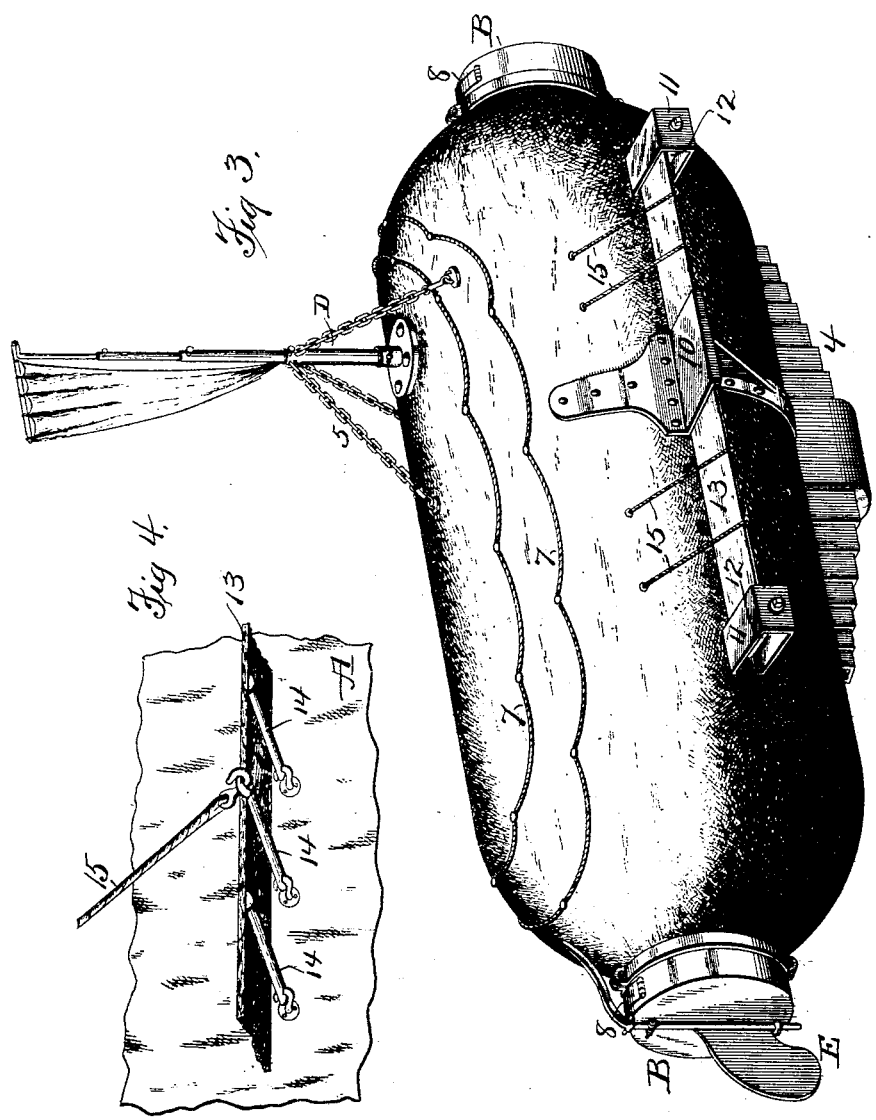

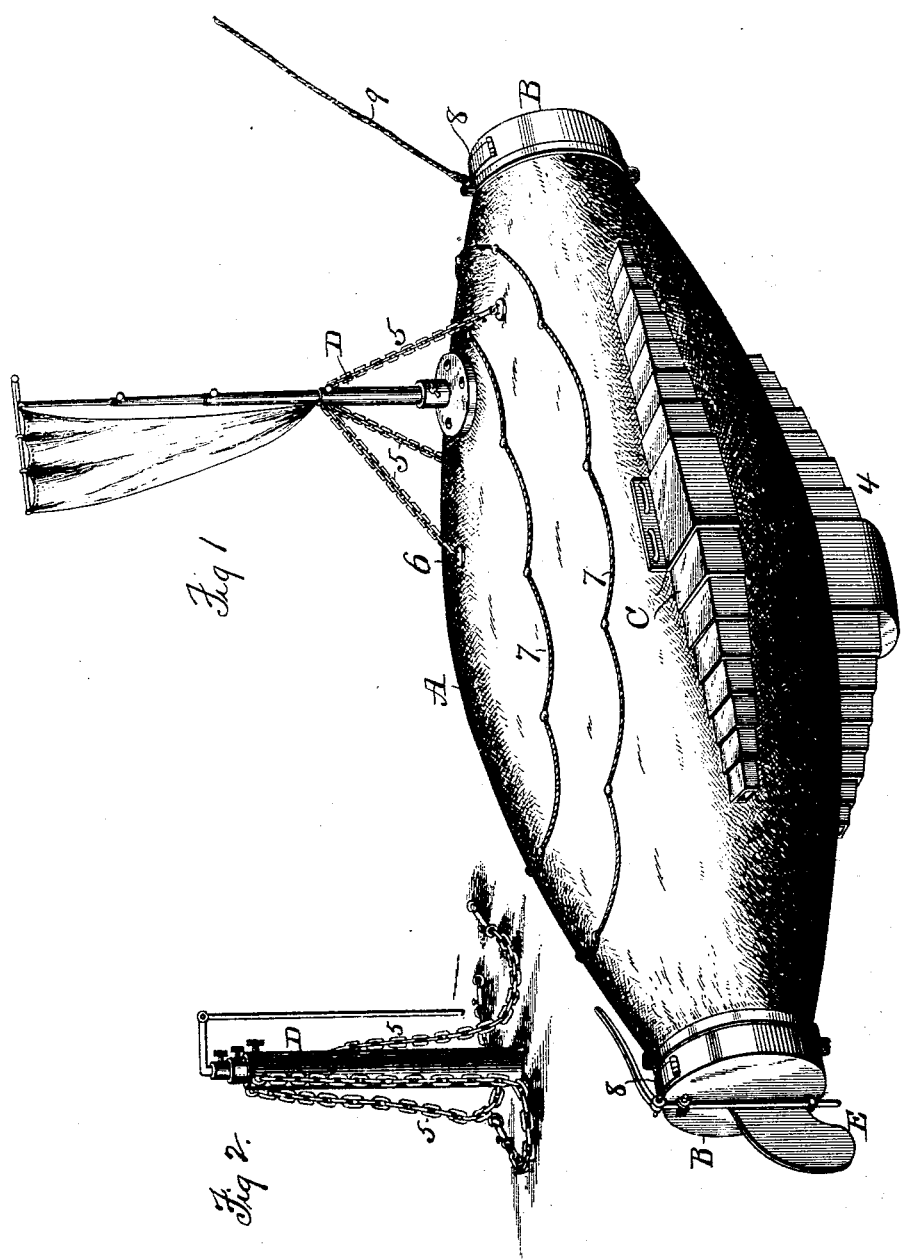

No. 671,163. Patented Apr. 2, 1901.
A. R. FERGUSSON.
LIFE SAVING APPARATUS.
(Application filed Mar. 23, 1900.)
(No Model.) 9 Sheets—Sheet 3.
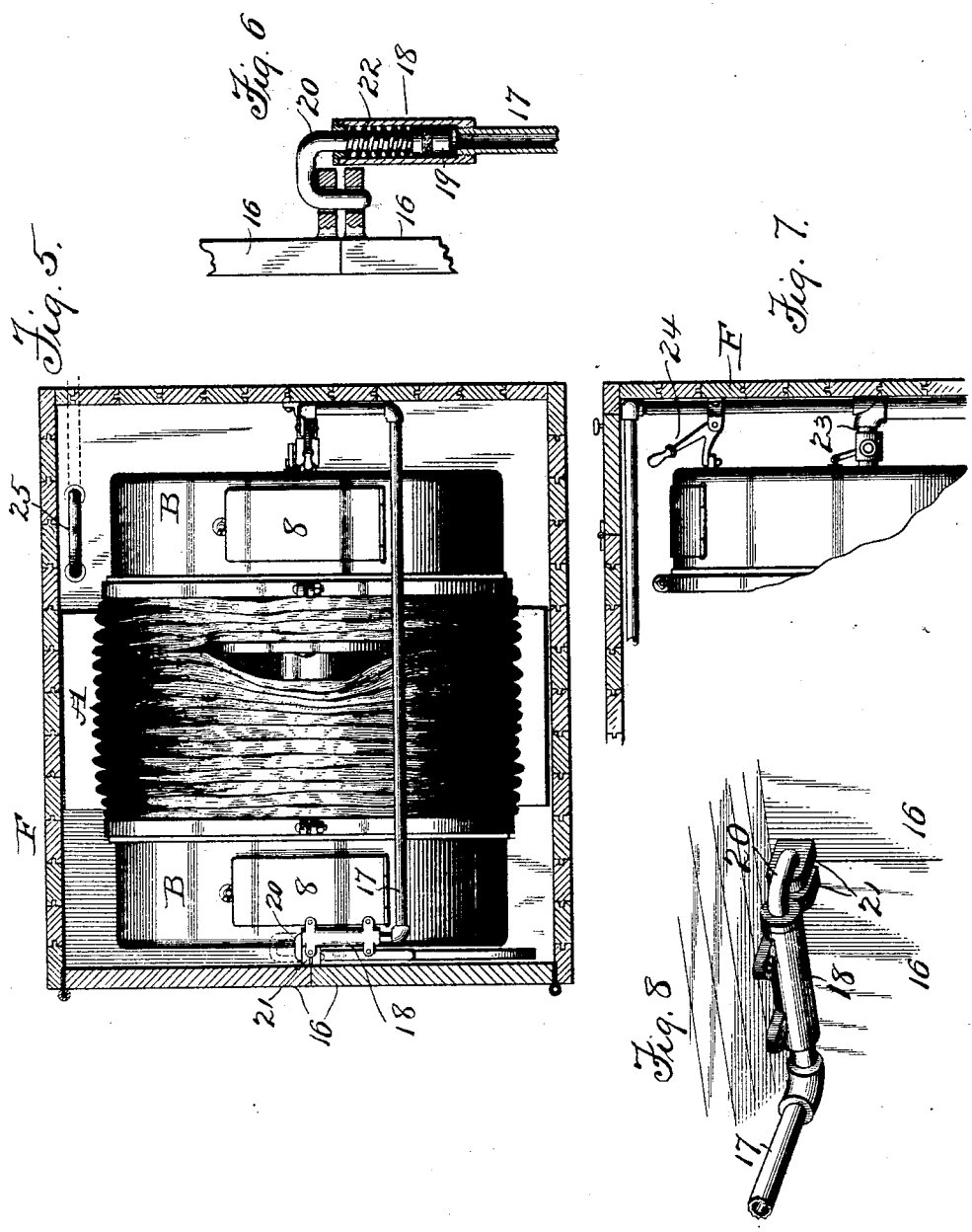
Witnesses—
G. F. Downing
S. G. Nottingham
Inventor,
A. R. Fergusson
By H. A. Seymour
Atty.

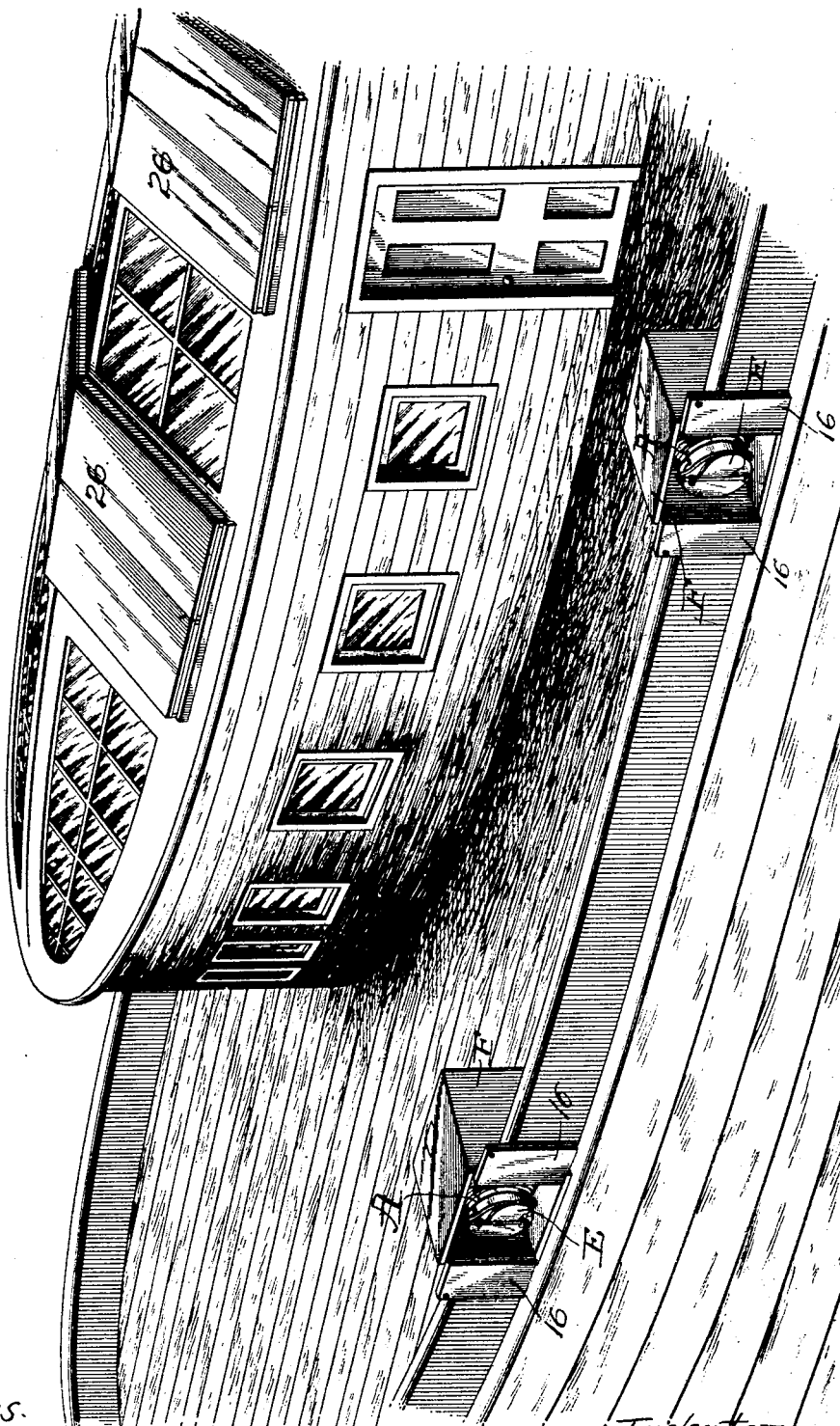

No. 671,163. Patented Apr. 2, 1901.
A. R. FERGUSSON.
LIFE SAVING APPARATUS.
(Application filed Mar. 23, 1900.)

(No Model.) 9 Sheets—Sheet 5.

Witnesses.
G. F. Downing
D. G. Nottingham

Inventor
A. R. Fergusson
By H. A. Seymour
Atty.

No. 671,163. Patented Apr. 2, 1901.
A. R. FERGUSSON.
LIFE SAVING APPARATUS.
(Application filed Mar. 23, 1900.)
(No Model.) 9 Sheets—Sheet 6.

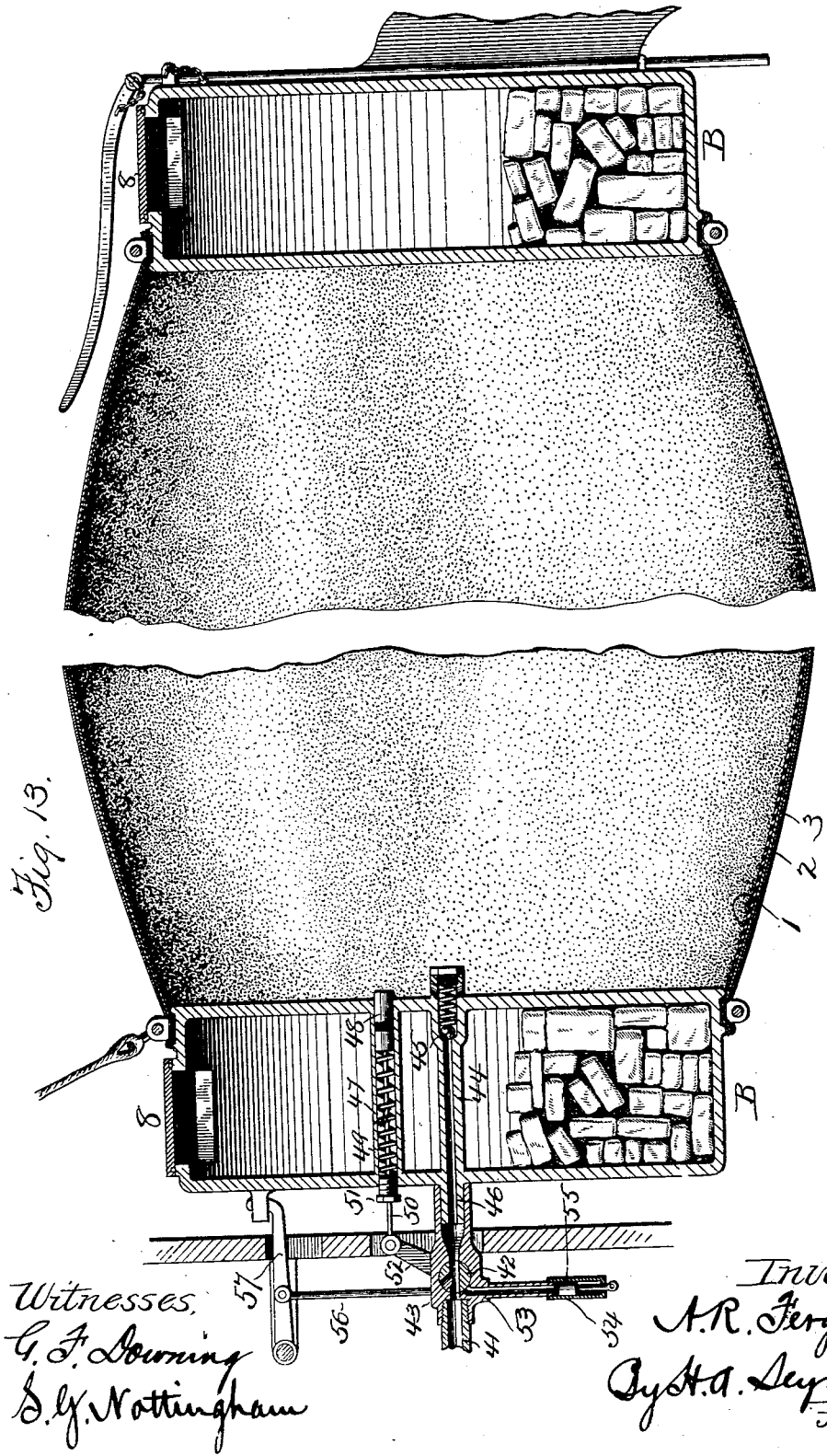

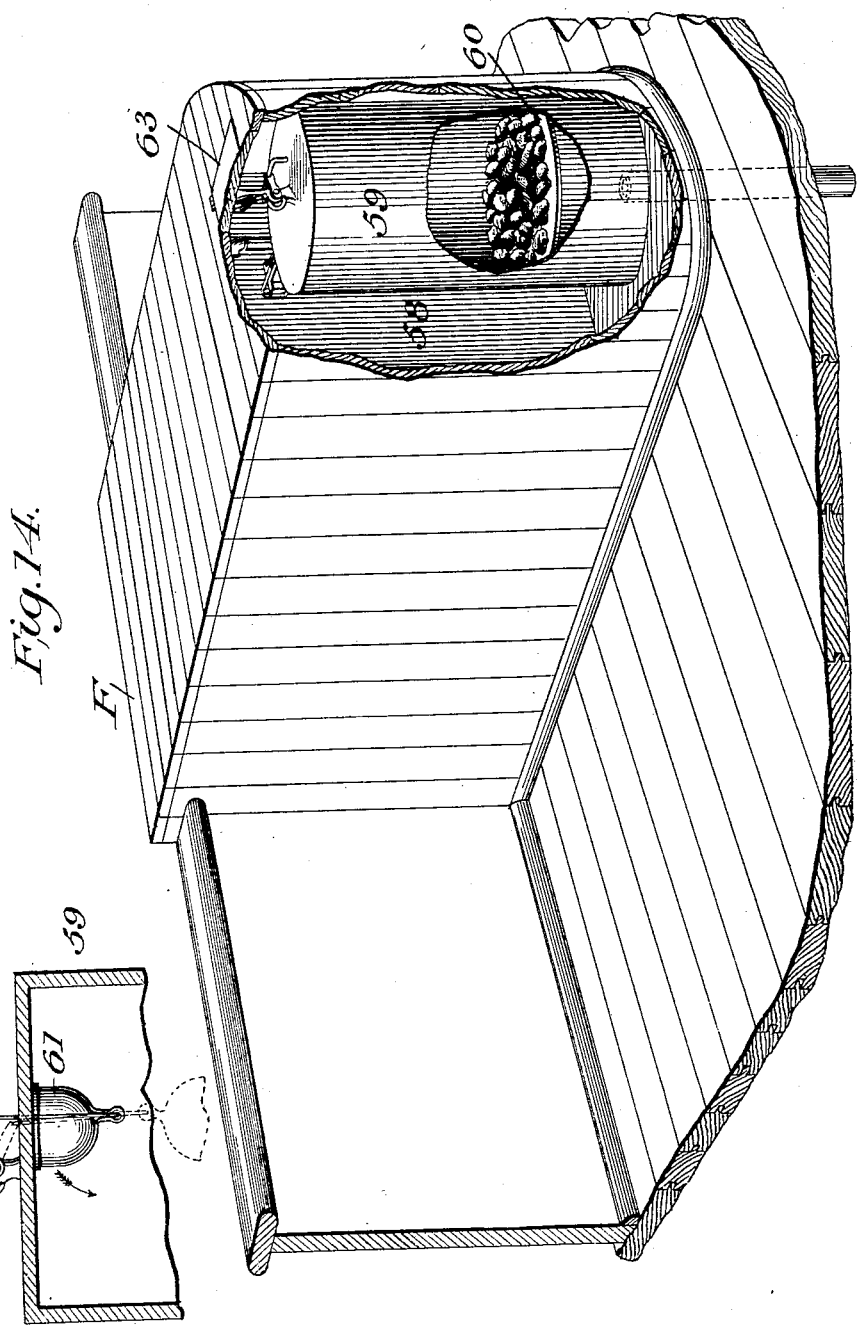

No. 671,163. Patented Apr. 2, 1901.
A. R. FERGUSSON.
LIFE SAVING APPARATUS.
(Application filed Mar. 23, 1900.)
(No Model.) 9 Sheets—Sheet 9.
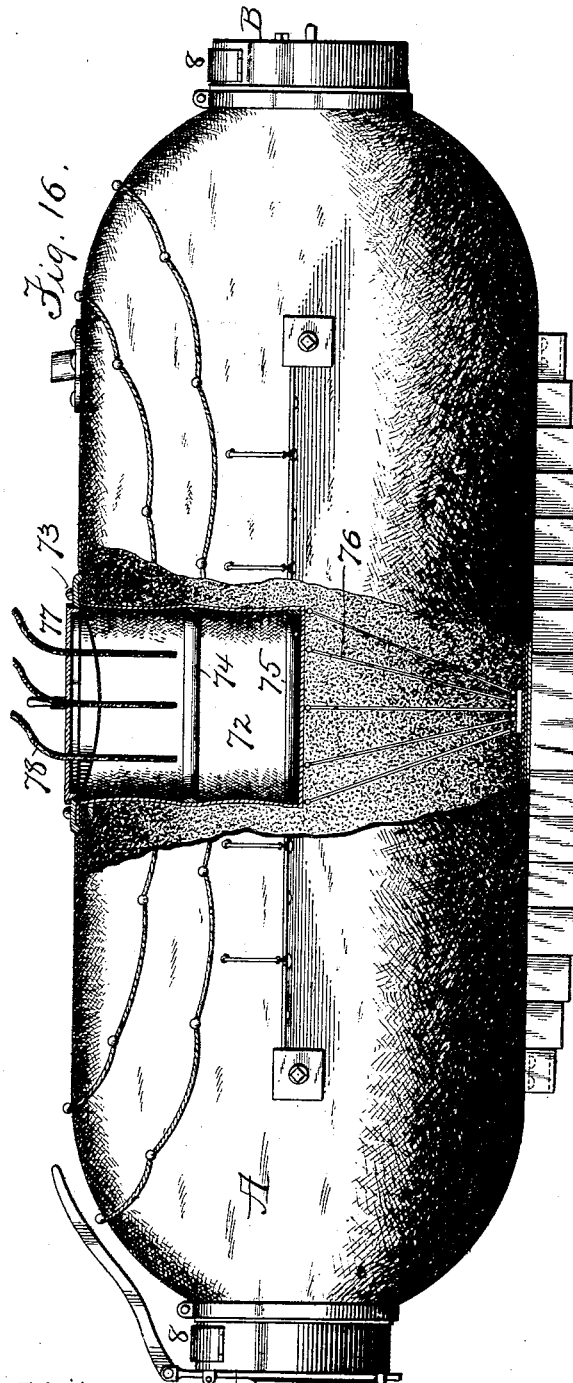
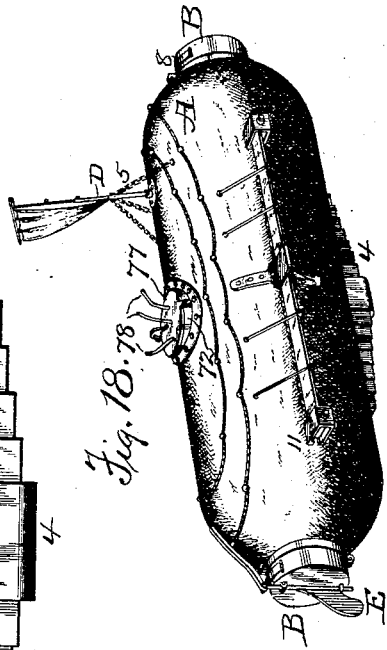
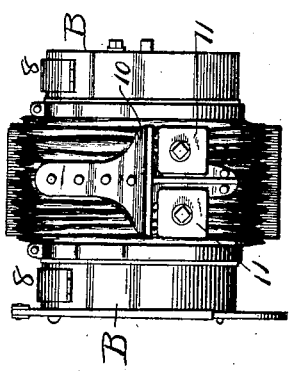
Witnesses
G. F. Downing
S. Y. Nottingham
Inventor
A. R. Fergusson
By H. A. Seymour
Atty.

UNITED STATES PATENT OFFICE.

ALAN ROBB FERGUSSON, OF NEW YORK, N. Y.

LIFE-SAVING APPARATUS.

SPECIFICATION forming part of Letters Patent No. 671,163, dated April 2, 1901.

Application filed March 23, 1900. Serial No. 9,898. (No model.)

*To all whom it may concern:*

Be it known that I, ALAN ROBB FERGUSSON, a resident of New York, in the county of New York and State of New York, have invented certain new and useful Improvements in Life-Saving Apparatus; and I do hereby declare the following to be a full, clear, and exact description of the invention, such as will enable others skilled in the art to which it appertains to make and use the same.

My invention relates to an improvement in life-saving apparatus, and has for one object to provide a number of simple, light, and collapsible apparatus carried by a ship in their collapsible form and serving when inflated to act as life buoys or rafts.

A further object is to provide collapsible apparatus adapted to be normally stored on a ship and to provide means for automatically inflating and releasing said apparatus so that it can serve as life buoys or rafts.

A further object is to provide a ship with a number of collapsible life-buoys normally stored and protected in compartments in the sides of the ship and to provide means for automatically opening said compartments, inflating the buoys, and releasing or discharging the latter.

A further object is to provide a life buoy or raft which shall comprise a body made of impervious collapsible or flexible material to be inflated with air or gas and provided with means for supporting persons and means for storing provisions, and which may also be provided with means for propelling and steering purposes.

With these objects in view the invention consists in certain novel features of construction and combinations and arrangements of parts, as hereinafter set forth, and pointed out in the claims.

Figure 10:
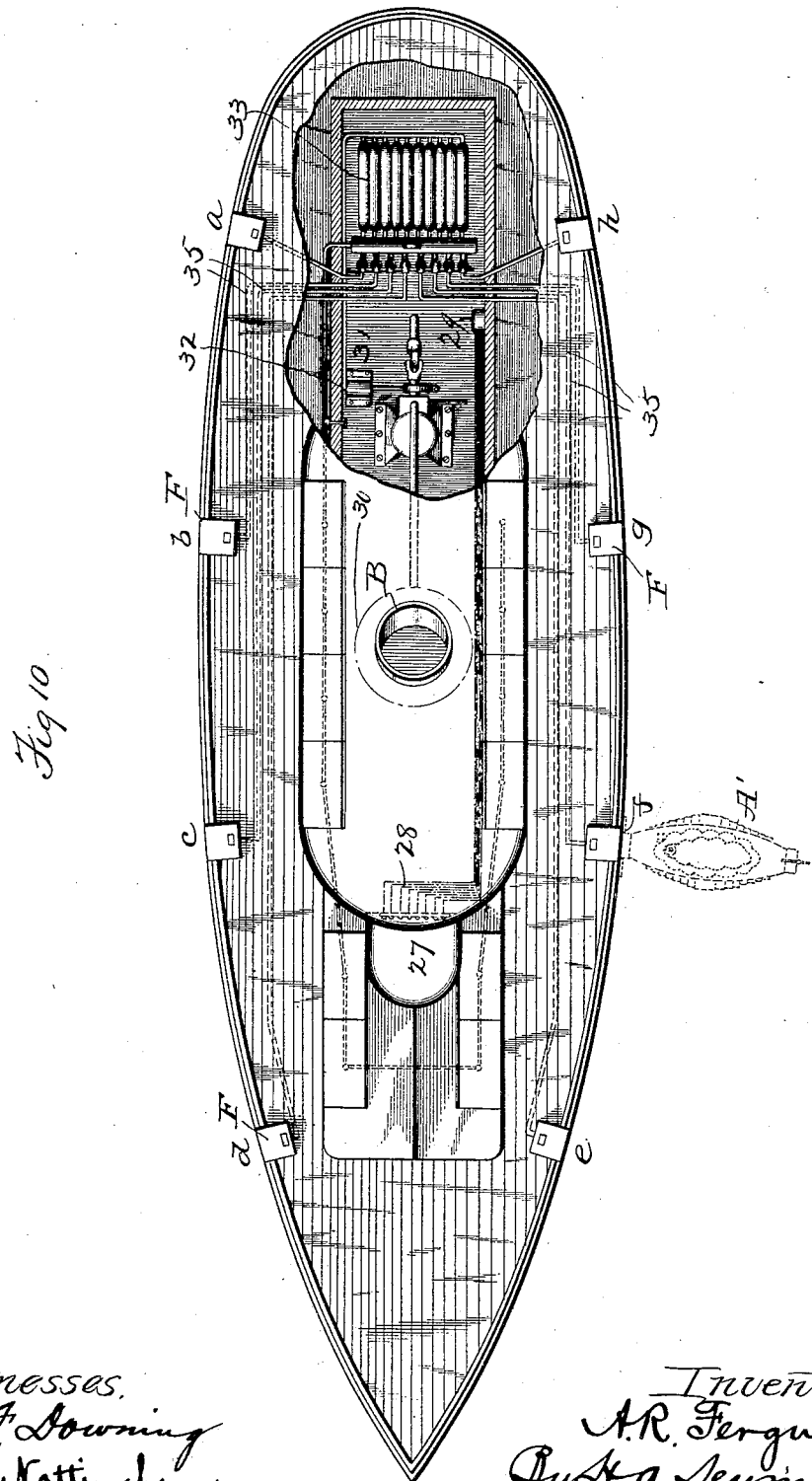
Figure 11:
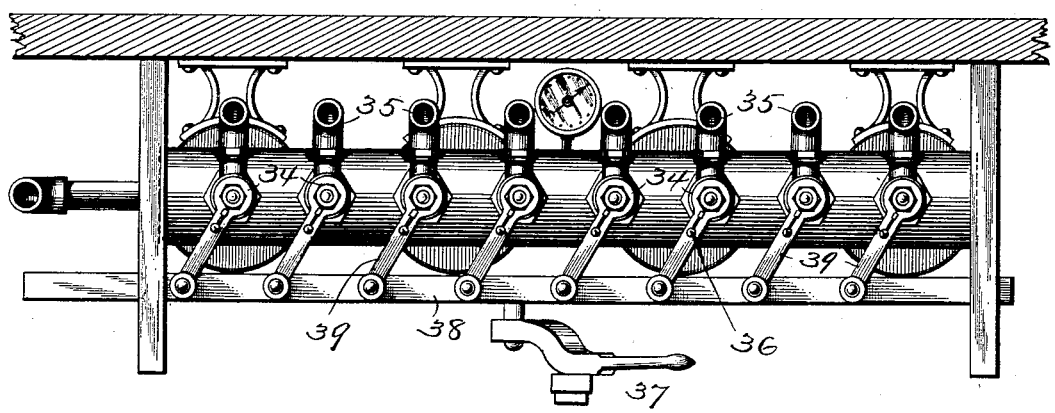
Figure 12:
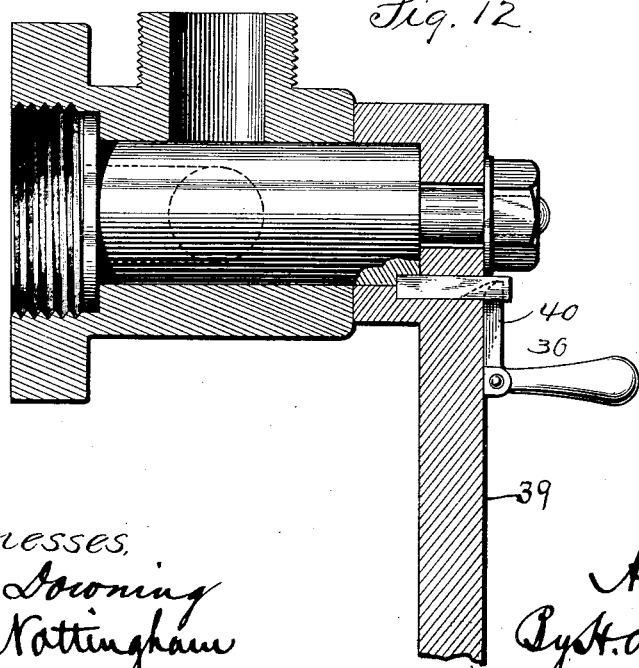

In the accompanying drawings, Figure 1 is a perspective view of one form of my life-saving apparatus, showing the same ready for use. Fig. 2 is a detail view of the mast and appurtenances. Fig. 3 is a perspective view of a buoy somewhat different in shape from the form shown in Fig. 1 and provided with a different form of platform. Fig. 4 is a detail view of the platform shown in Fig. 3. Fig. 5 is a view showing the buoy collapsed and stored. Figs. 6 and 8 are detail views of the latch device for normally locking the doors of the compartment in the ship containing the buoy and for automatically releasing said doors. Fig. 7 is a fragmentary view showing a portion of the buoy and compartment containing the same and also means for manually releasing the inflated buoy. Fig. 9 is a perspective view of a portion of a ship, showing the comparative size of the buoys and the space occupied on the deck, this view also showing the location of pneumatic rafts located on the roof of the house of the ship. Fig. 10 is a plan view of a ship with the deck partly broken away and showing the application of my improvements. Figs. 11 and 12 are views showing details of the valve mechanism of the inflating apparatus. Fig. 13 is a sectional view, partly broken away, of the buoy and automatically-operating devices for controlling the inflation and launching of the buoy. Figs. 14 and 15 are views illustrating the manner of using my improvements with a gas-generator with which to inflate the buoy. Figs. 16 and 18 are views of the buoy provided with means for the safe keeping of infants. Fig. 17 is a view of the buoy shown in Fig. 3 deflated and collapsed.

A represents my improved buoy. The body of the buoy is constructed interiorly with a rubber bag 1, immediately outside of which is a canvas bag 2 of medium weight, and outside of all is an extremely heavy canvas covering 3, to which is attached by rivets and washers all the equipment hereinafter described. In order that the buoy may preserve its equilibrium, it is provided with a heavy telescoping keel 4. At the ends of the body A of the buoy boxes B B are provided for storage purposes and are made of metal. The buoy is also provided on the sides with fins or platforms C for the accommodation of persons, and these fins or platforms may be made in telescoping sections, as shown in Fig. 1. The buoy is also provided with a telescopic mast D, which when in use may be braced by chains 5, attached at one end to the upper end of the lower section of the mast and at the other ends to eyes 6, secured to the buoy. I might here state that I have estimated the entire weight of my apparatus at about four thousand pounds. The buoyancy of this pneumatic buoy will be thirty-two thousand pounds, and the weight of the buoy being four thousand pounds leaves a net buoyancy of twenty-eight thousand pounds. The four thousand pounds will sink the buoy about sixteen inches and with a keel of two thousand pounds (which is included in the four thousand pounds weight) will give the buoy a fair degree of steadiness.

The mast D, above referred to, telescopes, as clearly shown in Fig. 2, and normally this mast will be packed in one of the storage-boxes B. The buoy is provided with a rudder E, which folds up completely against the storage-box B, as best shown in Fig. 9. The fins or platforms C may be made of some very light substance, such as aluminium, and may be made two feet broad and fifteen feet long.

The buoy is made, as will be seen, to collapse, as best shown in Fig. 5, this being made possible from the fact that only the center and the two ends of the fins are attached to the canvas bagging, the telescoping keel being attached to the buoy in the same manner. Ropes 7 encircle the top of the buoy and serve as handholds for the occupants.

In the tops of the storage-boxes B watertight doors 8 are provided to afford ready access to the storage-compartments. A rope 9 is attached at one end to the buoy, and at the other end said rope is secured in the box F, in which the buoy is normally inclosed, so that when the buoy is launched the rope will keep it connected with the ship on which the box F is located. Before the vessel sinks the rope will of course be detached from the buoy.

The buoy shown in Fig. 3 is similar in every detail except its shape and the application and construction of the fins or platforms on the sides.

In the form shown in Fig. 3 it will be noticed that the buoy is cylindrical throughout the greater portion of its length, thus giving straight instead of curved sides. The fins or platforms comprise a central bracket 10, secured to the canvas, end brackets 11, having spools 12 therein, and the platform proper, 13. The platform 13 consists of very heavy canvas, across the under side of which strips 14 of metal or wood are secured, and when the buoy is in use these strips are attached to the body thereof, and small chains 15 assist in preventing the canvas platform from sagging, as shown in Fig. 4. When the buoy is deflated, the canvas strip may be wound on the spools 12 in the brackets 11, which come together and fit snugly under the central bracket, as shown in Fig. 17. When the buoy is inflated, the canvas strip or platform 13 unrolls until it is taut.

In Fig. 5 the buoy is shown collapsed and stored in the box F, located on the deck of the ship, as shown in Figs. 9 and 10. When the buoy is inflated, it is intended that it should escape through the open door of the box in which it is contained. The doors 16 of the box F must of course be kept securely fastened under normal conditions, and hence it will be understood that in case of a great disaster occurring to a very large vessel on which there might be, say, twenty or more of these buoys it will be appreciated that it would require too much time to unlock all the doors separately to permit the launching of the buoys. To effect the automatic unlocking of the doors, devices shown in Figs. 5, 6, and 8 may be employed. Air-pipes 17 18 are located within the box F, as shown in Fig. 5, and connected with a compressed-air chamber, hereinafter to be described. A piston 19 is located within the pipe 18, and projecting from this piston is a hook-shaped latch or bolt 20, adapted to engage keepers 21 on the doors 16, the bolt being normally retained in engagement with the keepers by means of a spring 22, located within the pipe 18. When air is permitted to enter the pipe 18, it will actuate the piston 19 and force the bolt 20 out of the keepers, thus releasing the doors. The air at the same time rushes into the deflated buoy through a pipe 23, which forces itself outwardly and pushes the unlocked doors of the box or compartments F open.

A hand-operated latch 24 (shown in Fig. 7) might be used for manually releasing the buoy; but to release a number of buoys simultaneously automatic devices, as hereinafter described, will be employed.

In Fig. 5 a small radiator is represented at 25 and may be connected with the heating apparatus of the vessel for keeping the compartment F, containing the deflated buoy, at a normal temperature in cold weather, thus preventing ice from incapacitating the buoy.

In Fig. 9 is represented a section of a vessel, showing the comparative size of the buoys and the space occupied on the deck. The size of the box F for the storage of the buoy will be approximately four feet by four feet. In the drawings I have shown the boxes F located on the deck, but as the space occupied by them is so small room for them could be readily made somewhere below deck. In Fig. 9 on the roof of the cabin-house between the skylights deflated pneumatic rafts 26 are located and clasped in position.

I desire to call attention to the fact that no reconstruction of the boat is necessary in the application of my buoys and rafts. They may be placed upon any vessel at the most convenient and advantageous points.

In Fig 10 a plan view of a two hundred foot boat is represented, provided with eight buoys a b c d e f g h, disposed along the deck and shown approximately proportionate to its size and the relative space they occupy. At A' one of the buoys is shown in dotted lines as being launched and showing the size of the inflated buoy as compared with the size of the boat.

In Fig. 10, 27 represents the pilot-house, in which will be seen a number of electric buttons 28, connected with the indicator 29. The boiler 30 is represented in the engine-room 31, and at 32 is shown an automatic pump which keeps the air in a compressed-air chamber 33 at a given pressure.

In case a collision has occurred and the buoy c and its appurtenances have been destroyed, the captain in the pilot-house noting that his vessel may sink wishes to have all the buoys launched. If all the valves from the air-chambers are open, the air would escape at the destroyed buoy c and the balance of the buoys would fail to become inflated. The captain therefore touches a button of the indicator, showing that buoy c has been disabled, and the engineer then throws out the compressed-air connection with that buoy, and he then opens the valves, which permit the air to rush to the remaining buoys. This operation is practically instantaneous, and the buoys now hang from the sides of the vessel ready to be released.

The compressed-air mechanism shown in Fig. 10 and the valve mechanism above referred to are shown in detail in Figs. 11 and 12. In Fig. 11 will be seen a series of eight valves 34, and pipes 35 connect these valves with the eight buoys on deck. In the case of accident to, say, buoy c, as hereinbefore referred to, the operator will operate a lever 36, connected with said valve, and thus disconnects this valve from the means which operates the other valves. A lever 37 (which is connected with all the valves through a bar 38 and arms 39) will then be thrown, and the air will rush to the various buoys instantaneously, except buoy c, which has been cut out. The details of the devices whereby the valve 34 in the pipe of any disabled buoy is rendered inoperative are clearly shown in Fig. 12, where 40 represents a key for locking the valve, said key being provided with the lever 36, which when thrown down will disconnect the valve from the coöperating arm 39, so that when the bar 38 is moved by the lever 37 this particular valve will not be opened.

In Fig. 13 is shown a section of two ends of the life-buoy, showing the end compartments for provisions, &c. This view also shows the details of devices for inflating and automatically releasing or launching the buoy. The air flows through pipe 41, a valve 42 in a coupling 43, a pipe 44, passing through the compartment B and past a check-valve 45 in the pipe 44 and into the buoy. The pipe 44 is provided with a nipple 46 to enter the coupling 43. A tube 47 passes through the compartment B, parallel with the pipe 44, and in this tube a piston 48 is located. A spring 49, adjusted to resist a pressure slightly less than fifty pounds, is located in the tube 47 and bears against the piston 48. A rod 50 is connected with the piston 48 and passes out through a nipple 51, screwed in the end of the tube 47, said rod being adapted to detachably engage the end of an arm 52, projecting from the valve 42. A pipe 53 communicates with the coupling 43 in advance of the valve 42 and communicates with a cylinder 54. A piston 55 is located in the cylinder 54 and is connected by means of a rod 56 with a pivoted hook-shaped bolt 57, which engages the buoy and maintains it normally connected with the boat. The valve 42 is constructed to maintain the passage to the buoy normally open, and when turned to close this passage the valve will direct air-pressure to the cylinder 54. This operation of the valve 42 will be effected automatically when the pressure reaches a predetermined degree through the medium of the piston 48 and its connection with said valve. The compressed air entering the cylinder 54 will move the piston 55 and motion will be transmitted to the hook-shaped bolt 57 to release the buoy.

It will be seen from this description that the inflating of the buoy, releasing it from the air compressing and conveying apparatus, and launching the buoy are automatic.

It is desirable, as hereinbefore intimated, to provide means for adapting my improvements to sailing crafts and such as have no electrical or steam power. For this purpose the construction shown in Figs. 14 and 15 may be employed. Fig. 14 shows the box F which contains the buoy provided with a separate compartment 58, in which a carbonic-gas generator 59 is located. This generator may contain carbon, as shown at 60, and is provided in its top with a water-receptacle 61, as shown in Fig. 15. The receptacle 61 may be normally held up by a latch device 62, which can be manipulated by hand to release said receptacle to discharge its contents onto the carbon, or instead of carbon marble-dust, bicarbonate of soda, or other similar material may be used and acid discharged from the receptacle 61 into such material to generate carbonic-acid gas, or other gas may be generated by uniting other chemicals by means of the apparatus above described. The receptacle 61 will be preferably constructed to resist cold, so as to prevent its contents from freezing, and is air-tight to prevent evaporation and water-tight to prevent leakage. As soon as gas is generated it will flow to the buoy, operate the latch device, Figs. 5, 6, and 8, for the doors, and effect the inflation and release and launching of the buoy, all as hereinbefore described.

The compartment of the box F containing the gas-generator is provided with a hinged cover 63, as shown in Fig. 14.

The buoy for yachts could be very much smaller than upon larger boats. Such smaller buoys could be made of such size as to occupy a space about three feet by three feet by four feet and will weigh, box and all, about eight hundred pounds.

Fig. 16 shows the buoy provided with a water-tight compartment to be used especially for the safekeeping of infants. This compartment comprises an air-tight collapsible canvas bag 72, depending within the buoy and provided with rings 73 74 and a metal disk 75. A series of ropes 76 connect the bottom of the bag 72 with the bottom of the buoy. When the buoy is deflated, the bag 72 will be collapsed, and when the buoy is inflated the bag will be opened out, as will be readily understood. The bag or compartment 72 is provided with a water-tight cover 77, through which air-tubes 78 pass.

In Fig. 18 is shown a perspective view of the inflated buoy, showing the cap of the bag or compartment 72 with the air-tubes 78 protruding.

Various slight changes might be made in the details of construction of my invention without departing from the spirit thereof or limiting its scope, and hence I do not wish to limit myself to the precise details herein set forth.

Having fully described my invention, what I claim as new, and desire to secure by Letters Patent, is—

1. In a life-saving apparatus, the combination with a box or compartment to be located on a boat, of an inflatable device in said compartment, means for setting free the inflatable device from the boat, and a heater in said box or compartment.

2. In a life-saving apparatus, the combination with a box or compartment to be located on a boat, of an inflatable device in said box or compartment, a door for keeping said box or compartment tightly closed, a lock for said door and means for automatically inflating said device and actuating said lock to release said door.

3. In a life-saving apparatus, the combination with a box or compartment to be located on a boat, of an inflatable device in said box or compartment, and a gas-generator located in said box or compartment for inflating said device.

4. In life-saving apparatus, a collapsible buoy, provided with a collapsible keel, collapsible platforms and storage-chambers.

5. In a life-saving apparatus, a collapsible buoy provided with collapsible platforms, storage-chambers, a collapsible mast, and a rudder.

6. In a life-saving apparatus, an inflatable, collapsible buoy having a water-tight collapsible living-compartment therein, a cover for said compartment, and air-tubes projecting through said cover and entering said compartment.

7. In a life-saving apparatus, an inflatable buoy, and a collapsible platform attached to said buoy, said platform consisting of a series of brackets, spools therein and a flexible platform adapted to wind on said spools.

8. The combination with a boat, of an air-bag, platforms on said air-bag, and means for inflating and discharging said air-bag.

9. The combination with a boat, of an air-bag, platforms and a keel on said bag, and means for automatically inflating and discharging said bag.

10. The combination with a boat and a series of inflatable buoys, of an air-tank, pipes for conducting air from said tank to said buoys, valves for said pipes, means for operating said valves simultaneously and means for preventing the operation of a valve controlling the passage of air to a defective buoy.

11. The combination with an inflatable body, of a telescoping keel attached thereto and telescopic fins or platforms on said body.

12. The combination with an inflatable body, of a compartment at each end thereof, a telescopic fin or platform at each side of said body and a telescopic keel on the bottom of said body.

In testimony whereof I have signed this specification in the presence of two subscribing witnesses.

ALAN ROBB FERGUSSON.

Witnesses:
H. C. BEAUCHAMP,
EDNA BLAMAY.